United States Patent [19]

Robertson et al.

[11] Patent Number: 5,318,699

[45] Date of Patent: Jun. 7, 1994

[54] DENITRIFICATION OF SEPTIC TANK EFFLUENT

[75] Inventors: William D. Robertson; John A. Cherry, both of Waterloo, Canada

[73] Assignee: University of Waterloo, Waterloo, Canada

[21] Appl. No.: 845,133

[22] Filed: Mar. 2, 1992

[30] Foreign Application Priority Data

Mar. 4, 1991 [GB] United Kingdom ............... 9104510

[51] Int. Cl.⁵ ............................................. C02F 3/30
[52] U.S. Cl. ................................. 210/151; 210/170; 210/532.2; 210/605; 210/903
[58] Field of Search ............... 210/605, 630, 615, 617, 210/747, 150, 151, 170, 259, 262, 903, 532.2

[56] References Cited

U.S. PATENT DOCUMENTS

| | | | |
|---|---|---|---|
| 947,333 | 1/1910 | Hamilton | 210/605 |
| 1,950,841 | 3/1934 | Crawford | 210/532.2 |
| 2,795,542 | 6/1957 | Horne et al. | 210/170 |
| 3,823,825 | 7/1974 | Bergles et al. | 210/170 |
| 4,094,773 | 6/1978 | Beaumont | 210/630 |
| 4,465,594 | 8/1984 | Laak | 210/903 |
| 4,576,717 | 3/1986 | Collin et al. | 210/747 |
| 4,892,658 | 1/1990 | Martin et al. | 210/903 |

Primary Examiner—Wilbur Bascomb, Jr.
Assistant Examiner—Christopher Upton
Attorney, Agent, or Firm—Anthony Asquith & Co.

[57] ABSTRACT

Water draining from a septic tank contains ammonium, which traditionally is oxidized to nitrate in an aerobic soakaway. When the effluent enters the groundwater, the resulting nitrate concentration can be troublesome. A body of organic carbon, e.g. wood chppings, is provided, and the nitrate-laden effluent is passed through the carbon. The carbon is placed in the ground so as to be anaerobic: for example, the carbon may be placed below the water table; or the carbon may be mixed into a layer of fine silt, which is maintained in a state of tension-saturation by the effluent. Under anaerobic conditions, the nitrate is reduced by micro-biological action. The carbon is located such that the effluent naturally flows through the carbon, no pumps etc being required. The carbon may be located directly below the soakaway, or the carbon may be in a trench positioned to the side if the groundwater has a lateral component of flow.

10 Claims, 2 Drawing Sheets

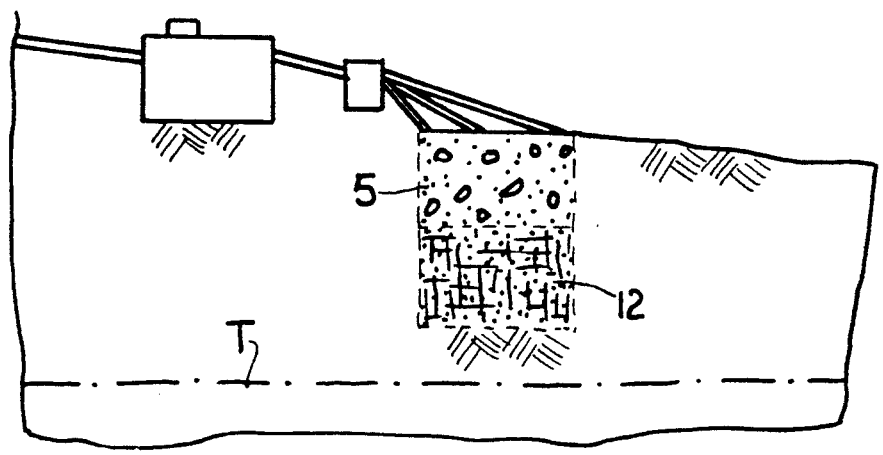
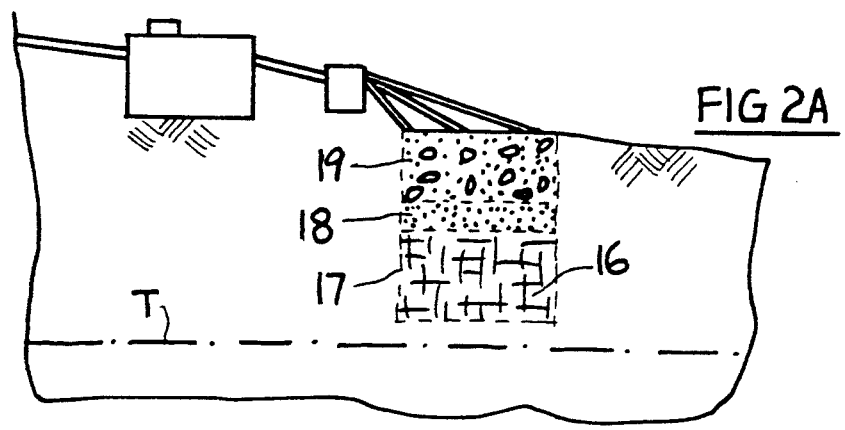
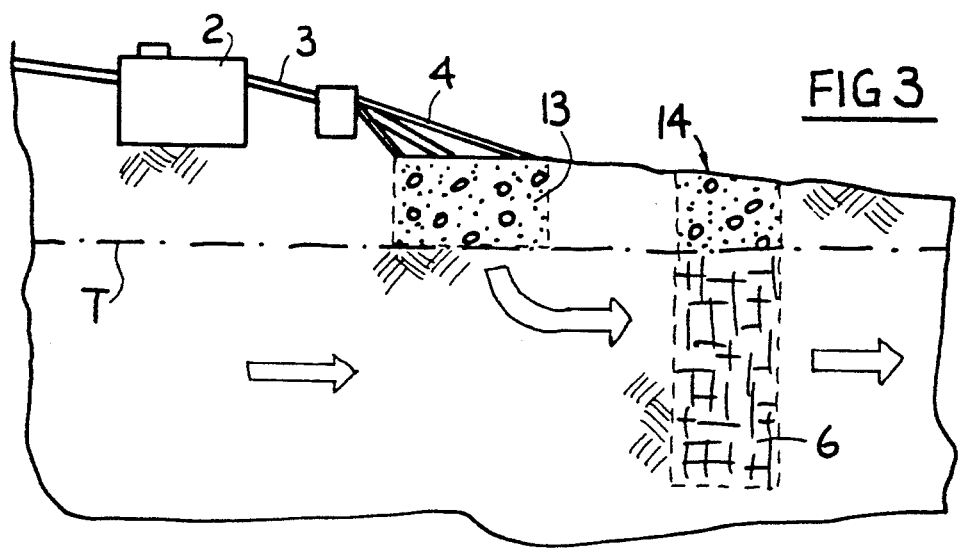

DENITRIFICATION OF SEPTIC TANK EFFLUENT

This invention relates to the treatment of liquid effluent from a septic tank.

A conventional disposal system for a septic tank includes an outlet pipe through which liquid effluent is led to a dispersal manifold. The dispersal manifold comprises a series of porous pipes through which the liquid effluent seeps out. The manifold disperses the effluent over a bed of soakaway material, such as gravel/sand. The soakaway is accessible to the atmosphere.

Ammonium ($NH_4+$) is present in a septic tank, and it is the function of the septic tank system to prevent these ions from entering the groundwater. Conventionally, the ammonium ions present in the effluent are reacted, under the aerobic conditions prevailing in the soakaway, to nitrate ($NO_3-$), whereby the ammonium ions substantially completely disappear.

Traditionally, the nitrate has been allowed to pass out of the soakaway and to enter the groundwater.

It is becoming increasingly unacceptable simply to dump the nitrates into the groundwater, and an aim of the invention is to provide a system for breaking down the nitrates emanating from the soakaway into relatively harmless substances, such as carbon dioxide and nitrogen gas.

It is also an aim of the invention to provide a system for breaking down the nitrates which is economical to assemble and install, and which is easy to service and maintain.

GENERAL FEATURES OF THE INVENTION

In the invention, the liquid effluent which emerges from the soakaway, in which the ammonium ions from the septic tank have been reacted into nitrate ions, is passed through a body of organic carbon.

In the invention, the body of organic carbon is maintained under anaerobic conditions.

Under the anaerobic conditions, micro-organisms present in the organic carbon tend to extract oxygen from the nitrate ions. It may be regarded that the oxygen from the nitrate ion is reacted into carbon dioxide, and the nitrogen from the nitrate ion is reacted into molecules of free nitrogen gas, as a result of the microbiological action.

Consequently, in the invention, the water emerging from the body of organic carbon can be expected to be substantially nitrate-free.

As to how the organic carbon is kept anaerobic, it is preferred in the invention that the body of organic carbon is kept below ground, i.e. below the water table. In this case, the exclusion of air is automatic, and complete (except when a drought depresses the water table temporarily) and yet no special tanks, pumps, etc. need be provided. The system can be entirely passive, although of course tests should be carried out periodically on the groundwater to ensure that the system is operating effectively.

Thus, in a typical installation which embodies the invention, water from the septic tank passes into the usual aerobic soakaway, in which ammonium is converted into nitrate; the nitrate-containing effluent water from the soakaway then passes into an anaerobic body of organic carbon. The water which emerges into the groundwater from the anaerobic body of organic carbon is substantially nitrate-free.

A conventional septic tank system has a simple single-stage disposal facility. This facility is kept aerobic, usually in that the disposal facility is located at the ground surface, or at least above the water table, whereby the water passing through the facility is open to atmospheric oxygen. The invention, on the other hand, provides a two-stage disposal facility: the water passes first through the aerobic facility as in the conventional system, but in the invention the water that emerges from the aerobic facility then passes through a body of organic carbon, which is kept under anaerobic conditions.

the conventional single stage system leaves nitrate in the effluent that enters the groundwater: the invention is aimed at reducing or removing the nitrate.

THE PRIOR ART

It has been proposed to include a body of peat in the aerobic soakaway. At least some of the ammonium passing through the peat generates $NO_2-$, which is then bio-accumulated into fungal growths. To a limited extent, this process is effective in ensuring clean groundwater. However, a disadvantage of the system is that nitrate can still enter the groundwater. The $NO_2-$ material may become separated from the peat, and exposed to the atmosphere, in which case it will oxidise to nitrate $NO_3-$. Besides, when water seeps through a body of exposed peat, oxygen tends also to enter the peat, with the result that the peat itself tends to become oxidised, and to disappear.

It has also been proposed to pass the nitrate-containing effluent from the aerobic soakaway through a tank, in which air is excluded from the tank, and to add carbon in the form of methanol, or the like, to the water passing through the tank. This may be contrasted with the invention in which the system is entirely passive, and no routine maintenance is needed (apart from periodic testing). Also, in this prior proposal, the water emerging from the aerobic soakaway must be collected for transfer to the anaerobic carbon tank, which means that the soakaway must be in some form of container, such as a tank, which requires a structure to function as a collection manifold, besides the dispersal manifold.

It has also been proposed, GB-2219617-A (BLOWES+, Dec 1989), for the purpose of controlling acid-generation from exposed mine tailings, to provide a layer of organic carbon in the anaerobic zone beneath the water table, within the body of tailings. Water infiltrating downwards through the tailings passes through this layer, which reduces the acid-causing sulphate ions.

DETAILED DESCRIPTION OF PREFERRED EMBODIMENTS

By way of further explanation of the invention, exemplary embodiments of the invention will now be described with reference to the accompanying drawings, in which:

FIG. 2 is a corresponding diagram of a second system which embodies the invention;

FIG. 2A is a corresponding diagram of a modification to the second system;

FIG. 3 is a corresponding diagram of a third system which embodies the invention.

Figure 1:
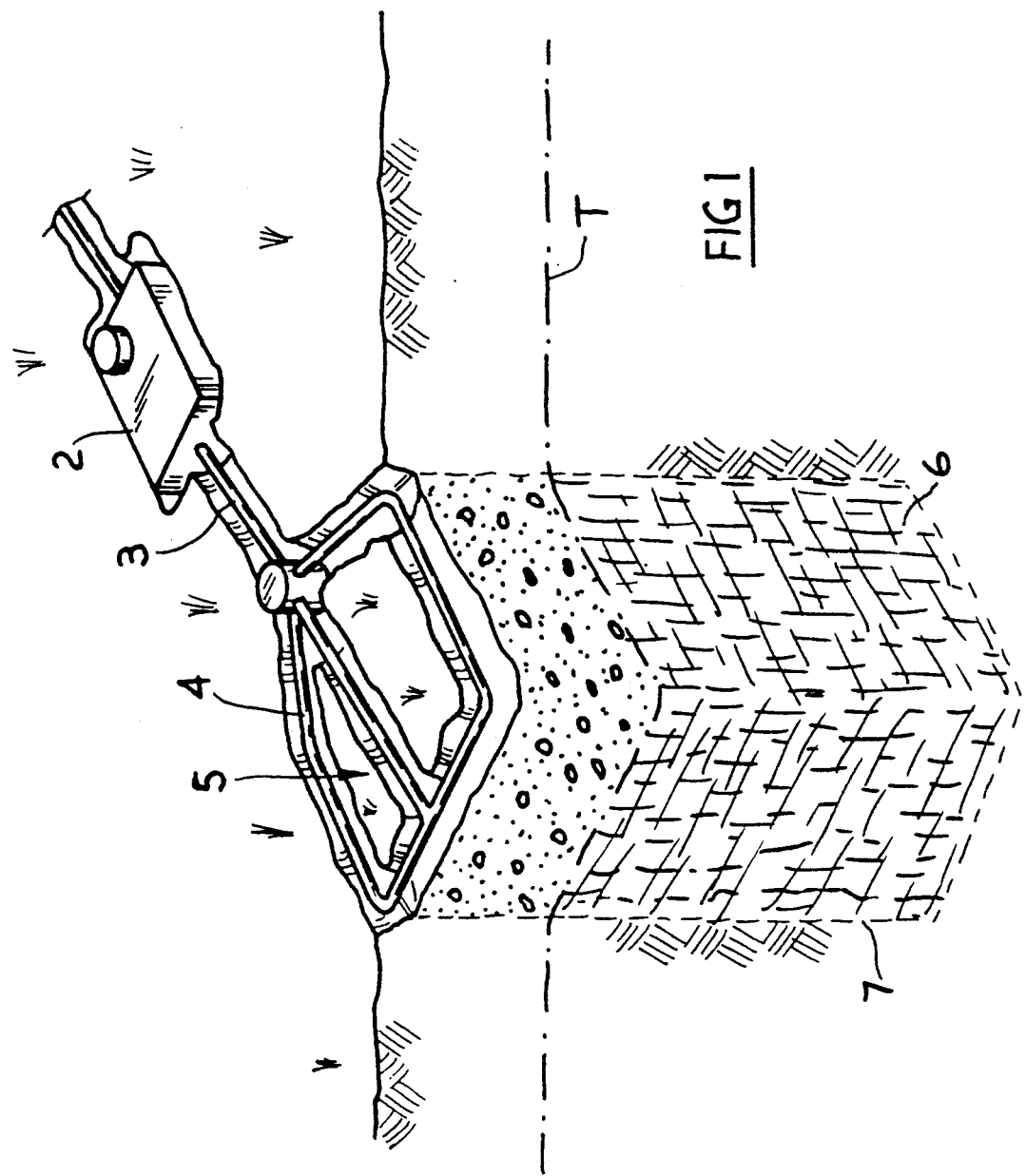
FIG. 1 is a diagrammatic representation of a denitrification system which embodies the invention.

The systems shown in the accompanying drawings and described below are examples which embody the invention. It should be noted that the scope of the invention is defined by the accompanying claims, and not necessarily by specific features of exemplary embodiments.

A septic tank 2 has an effluent discharge pipe 3. The pipe 3 leads to a dispersal manifold 4, from which the liquid effluent may drain (under gravity).

The liquid effluent drains from the manifold 4 into an aerobic soakaway 5. The soakaway 5 is maintained under aerobic conditions by virtue of the fact that the soakaway is located above ground, or at least above the water table T. The soakaway 5 comprises a bed of porous material, such as sand or gravel, whereby the liquid effluent can flow through the soakaway, and whereby air can contact the liquid.

The effluent from the septic tank contains ammonium ($NH_4^+$). As in a conventional septic tank system, the ammonium is oxidised to nitrate ($NO_3^-$) as the effluent passes through the aerobic soakaway 5. In the conventional system, however, the effluent containing the nitrate would be allowed simply to soak away into the ground, and thereby to enter the groundwater. In the system of FIG. 1, the nitrate-containing water that emerges from the aerobic soakaway 5 seeps downwards and passes through a body 6 of organic carbon. The body 6 of organic carbon is maintained under anaerobic conditions.

The nitrate ions, in the presence of organic carbon, and under strictly anaerobic conditions, are broken down by micro-biological action. Under the anaerobic conditions, micro-organisms present in the organic carbon extract oxygen from the $NO_3^-$ ions, thus leading to the creation of carbon dioxide gas and nitrogen gas, both of which are substantially harmless.

The organic carbon should be in such a form as will support the micro-organisms: wood chippings, of 5 cu cm volume, down to sawdust, have been found to foster the conditions under which the micro-organisms will be viable, whereby the bio-chemical reactions as described can take place. Other forms of organic carbon are suitable, however, such as shredded seaweed.

The body 6 of organic carbon should be porous, i.e. its permeability should preferably be no less than that of the surrounding soil material, in order that the body should not act as a barrier to the through-flow of water.

As shown in FIG. 1, the body 6 of organic carbon is maintained under anaerobic conditions by virtue of the fact that the body is located below the water table T.

In order to set up the system as described, a receptacle 7 first is excavated down into the ground, from the surface. The builder will first determine the level at which the water table can be expected to stabilize, noting seasonal variations, etc., so that it may be ensured that the carbon will be below the water table (nearly) all the time.

It may be noted that the receptacle 7 is merely an excavation, i.e. just a hole in the ground. The receptacle has no structure which would pose a barrier to the seepage of water through the ground.

The receptacle 7 is located directly underneath the soakaway 5. Soakaways are often built on soil that has a high sand/gravel content, and in this type of soil it is difficult to achieve a neat well-defined straight-sided hole. The excavation of the receptacle may be done by pile-driving an encircling barrier into the ground; soil is then removed from within the encirclement, and substituted by the carbon material. The barrier must then be removed, of course, since the effluent passing from the carbon material must be free to enter the groundwater. Alternatively, the excavation may be done by substitution-excavation techniques: these are based, as usual, on the motion of a powered excavation bucket, but the substitute material is inserted into the ground directly during the digging motion of the excavation bucket.

If the carbon were to become exposed to atmospheric oxygen, the carbon itself would then simply oxidise, and for that reason carbon that has been (accidentally) exposed to the air is not effective to promote the breakdown of the nitrate ions. Any carbon that becomes exposed is simply wasted—although a short-term exposure of the carbon, for example during a drought, when the water table falls unusually low, may not affect the carbon. The builder's aim should be, however, that the body of carbon can substantially never become exposed.

The organic carbon will often be in a form which floats, and it may prove difficult to maintain the physical stability of the body of carbon below the water table. The carbon may be placed in (porous) bags with a suitable heavy inert filler material, such as sand, in such cases. In a case where the carbon is mixed with a filler material, however, care should be taken that the carbon is not so dispersed that the viability of the micro-organisms might be affected.

When the builder has finished placing the body 6 of organic carbon below the water table, he then places the soakaway 5 above the body. The arrangement is such that the body 6 is physically directly below the soakaway 5, whereby water draining from the aerobic soakaway 5 simply falls down into the organic carbon body 6. No pump or other powered means is required to maintain the system in operation.

The builder completes the system by putting the manifold 4 in place on top of the soakaway 5, and making the connection 3 to the septic tank 2.

As noted, in the invention the body of organic carbon must be kept under anaerobic conditions. The organic carbon may still be effective after being exposed to air, but only if the exposure is for a short period. It is not essential, however, in all cases that the body of organic carbon must necessarily be placed below the water table.

For example, when the organic carbon is in the form of fine silt, the fact that water is passing through the silt, whereby the silt is saturated, can keep the silt body anaerobic, or at least all but an outer margin of the silt body. The maintained saturation of the water, in fine silt, prevents air from contacting the carbon. As shown in FIG. 2, when the organic carbon is in the form of silt the body 12 of organic carbon may be placed at ground level, i.e. above the water table T.

If the organic carbon is available in silt form, advantage can be taken of putting the organic carbon at or near the ground surface, whereby the cost may be avoided of excavating a receptacle deep underground. The organic carbon should still be so placed in relation to the soakaway that the effluent from the soakaway flows naturally, i.e. under the influence of gravity, directly into the carbon material. However, when the lie of the land permits it, it is highly convenient if the receptacle can be placed at ground level, rather than being placed below the water table, underneath the soakaway.

If the receptacle is to be placed below the water table, and if the water table is some way below the ground surface, it can become quite expensive to provide the receptacle, because of the depth of material that has to be dug out. However, it is relatively easy to excavate and remove sandy or gravelly soil that lies above the water table, because such soil, when dry, generally has enough coherence that the soil does not collapse into the excavation. Sandy/gravelly soil that lies below the water table, and is saturated with water, on the other hand, is comparatively much more difficult to excavate, because such soil, when wet, tends to collapse into the excavation. Therefore, when excavating below the water table in sandy soil, shoring or sheet piling barriers tend to be required.

In the invention, a depth of excavation into the saturated soil of not much more than about 1 meter is usually adequate, and the expense of such an excavation is fairly modest even if the water table may be 2 or 3 meters below the surface.

The soakaway itself should not be placed at a level where it might become water-logged, and therefore the soakaway should not be placed at too low a level, whereby it might become flooded. Equally, the carbon material should not be placed so high in relation to the water table that it might dry out. However, an occasional dry-out of the carbon material, even if lasting for several weeks, will do it little harm, whereas even a short-lived flooding of the soakaway should be avoided. If the carbon material becomes so dry that the anaerobic bacterial action stops, the micro-biological reactions can take a few weeks to become established again, but they will return in due course.

Thus, as mentioned, it is advantageous to place the carbon below the water table, and generally the expense associated with the kind of excavation likely to be needed is not troublesome. Sometimes, however, the deep excavation can be avoided by placing the carbon in silt, as mentioned.

Silt is fine-grained material, defined as having a particle size of 0.05 to 0.002 mm, the characteristic of silt being that it readily adopts a tension-saturated condition, in which water can travel vertically down through the silt, but air cannot. The layer 12 is preferably a mixture of fine-grain silt particles and fine grain organic carbon, e.g. sawdust. An upper margin of the layer of mixture might become oxidised, but the bulk of the sawdust would be kept isolated from the air by virtue of being mixed with silt. (In setting the proportions of the mixture, the organic carbon should not be allowed to become too dispersed, as that might inhibit the viability of the bacteria.)

Alternatively, as shown in FIG. 2A, the carbon might be placed in a bulk layer 16, in the bottom of the excavation 17, the silt being added as a separate layer 18 above the carbon 16. The soakaway 19 is then placed on top of the silt layer. In this case, it is possible that air might leak into the bulk carbon layer 16, perhaps from the sides, or from below. Because of this possibility, it is generally worthwhile therefore to take the step of mixing the silt and the organic carbon together in a single layer, as in FIG. 2.

The soakaway generally requires the use of sand/-gravel material; silt cannot be used for an aerobic soakaway. Therefore, if fine-grain silt is the natural local soil, sand/gravel will be imported for the soakaway. If sand/gravel is the natural soil, silt will be imported for the silt layer. Either way, if the organic carbon is to be placed above the water table, preferably, as mentioned, the organic carbon should be stirred into a mixture with the silt.

As mentioned, the silt layer is able to pass water downwards therethrough, and yet is able to seal itself against air ingress. Even though the silt is not under water, it remains in effect saturated because of tension-saturation, which obtains because of the small particle size. The water in the silt layer is nitrate-laden effluent water from the soakaway. The silt retains the effluent water until fresh effluent water soaks through; when the silt is mixed with the carbon, therefore, the residence time of the effluent in the carbon is effectively enhanced.

Whatever the manner of achieving it, the carbon material must be kept substantially anaerobic, and the usual way of achieving this is to place the carbon below the water table, i.e. in the groundwater. However, it is important not to place the carbon in fast-moving groundwater, as can be the case for example near a stream or river. This is because a substantial residence time is required to ensure that the micro-biological reactions can be completed.

Depending on the lie of the land around the septic tank, the effluent passing from the aerobic soakaway may have a marked lateral component of velocity, rather than simply soaking downwards into the aquifer. In such a case, the nitrate is borne along with the groundwater travelling through the aquifer. In this case, the option can arise of placing the body of organic carbon, not in a horizontal layer beneath the soakaway 13, but in a trench 14, as shown in FIG. 3, which is excavated down into the aquifer in the path of the plume of travelling nitrate.

The trench 14 preferably should be so arranged that the organic carbon lies below the water table T, as described in relation to FIG. 1. Alternatively, the carbon may be covered over, within the trench, to keep air out: but usually, in fact, it would not be too important even if a top margin of the carbon were to be exposed (and therefore wasted).

A key benefit that arises from putting the carbon in a trench, away to one side of the soakaway, is that the trench may be added later. Thus, the decision whether to invest in a system for removing the nitrate can be made after the septic tank and the soakaway have been put in place and are in operation. However, the trench option, as in FIG. 3, is really only practical where the aquifer is fairly shallow, and where the groundwater has a substantial lateral velocity.

Also, the carbon will eventually be all used up; if the carbon is underneath the soakaway, it can be quite expensive to replace the carbon. If the carbon can be in a trench that lies off to one side, a new trench can be provided, containing fresh carbon, without having to disturb the soakaway.

It may be noted also that as the carbon is used up, its residue occupies a smaller volume. Therefore, if the carbon material is positioned underneath the soakaway, the soakaway is likely to undergo some subsidence. The pipes and fittings etc of the manifold 4 should include provision for movement caused by such subsidence.

The quantity of carbon needed may be calculated as follows. An example of a septic tank system is one that handles effluent water from a building at an average flow rate, say for a typical family household, of 5,000 or 10,000 liters per week. This same flow of water eventually enters the groundwater (minus a small proportion that evaporates from the soakaway) as effluent from the body of anaerobic carbon material. A typical soakaway for such a system occupies a surface area of perhaps 100 sq meters.

The plan area of the receptacle 7, and of the body of organic carbon may be taken to be the same, and typically the receptacle may be excavated to a depth of 1 or 2 meters below the water table. With the volume of carbon that can be accommodated in this receptacle, and with this average rate of flow of effluent, and given the usual concentration of nitrate in the water emerging from a septic tank, it is recognised that such a quantity of carbon may be expected to remain effective to reduce the nitrate for many decades, and indeed for many centuries.

We claim:

1. Apparatus for removing nitrate from the liquid effluent from a septic tank drainage system, wherein:

the apparatus includes a septic tank and in-ground aerobic soakaway system, so arranged that liquid from the tank enters the soakaway;

the apparatus is so arranged that liquid from the soakaway seeps, under the action of gravity, into the ground below the soakaway;

the nature of the system is such that the effluent liquid leaving the soakaway is laden with nitrate;

the apparatus includes a quantity of solid material, including organic carbon, arranged in a body that is positioned in the ground in the direct path of the nitrate-laden effluent liquid seeping from the aerobic soakaway, the material being permeable, and the arrangement of the apparatus being such that the said effluent liquid from the soakaway seeps through the body of solid material;

the body of solid material is so placed in the ground that the solid material is excluded from contact with atmospheric oxygen;

the solid material is material which, under anaerobic conditions, is of a nitrate-reducing nature;

and the material is so arranged in the body as to promote the viability of nitrate-reducing bacteria therein.

2. Apparatus of claim 1, wherein the organic carbon is in the form of chippings of wood, the chippings having a volume each of between dust and 5 cu cm.

3. Apparatus of claim 1, wherein:

the apparatus includes a body of silt, placed in the ground, being silt of such fineness and type as to allow effluent liquid to seep through under gravity, but which does not allow atmospheric oxygen to pass through, and which thereby defines a zone of the ground in which oxygen is substantially excluded;

and the apparatus is so arranged that the body of solid material is located in the said zone.

4. Apparatus of claim 3, wherein the body of solid material is thoroughly mixed with the body of silt, whereby the two bodies form a composite body, positioned in the ground.

5. Apparatus of claim 4, wherein the composite body, in the ground, is of such a consistency as to remain tension-saturated.

6. Apparatus of claim 5, wherein particles comprising the silt are between 0.05 and 0.002 mm in size.

7. Apparatus of claim 3, wherein the layer of solid carbon material resides, in the ground, below the layer of silt, and the layer of silt resides below the soakaway.

8. Apparatus of claim 1, wherein the body of solid material is so located in the ground that the nitrate-laden effluent from the soakaway can seep naturally, and without powered assistance, from the soakaway into the body.

9. Apparatus of claim 1, wherein:

the arrangement of the apparatus is such that seepage of effluent from the soakaway is directed substantially straight downwards;

and the body of solid material resides in the ground directly below the soakaway.

10. Apparatus of claim 1, wherein:

the seepage path of nitrate-laden effluent from the soakaway has a substantial lateral component of direction;

and the apparatus includes a trench excavated across the seepage path, from the ground surface down into the ground, and the said material resides in the trench.

* * * * *